United States Patent
Nakajima et al.

(10) Patent No.: US 6,793,985 B2
(45) Date of Patent: Sep. 21, 2004

(54) LIQUID CRYSTALLINE MEDIUM AND LIQUID CRYSTAL DISPLAY

(75) Inventors: Shinji Nakajima, Atsugi (JP); Yasushi Sugiyama, Atsugi (JP); Yukiomi Tanaka, Ayase (JP); Takanori Takeda, Atsugi (JP); Hideo Ichinose, Odawara (JP)

(73) Assignee: Merck Patent GmbH, Darmstadt (DE)

( * ) Notice: Subject to any disclaimer, the term of this patent is extended or adjusted under 35 U.S.C. 154(b) by 79 days.

(21) Appl. No.: 10/259,727

(22) Filed: Sep. 30, 2002

(65) Prior Publication Data

US 2003/0161971 A1 Aug. 28, 2003

(30) Foreign Application Priority Data

Sep. 28, 2001 (EP) .............................................. 01123436

(51) Int. Cl.$^7$ ........................ C09K 19/34; C09K 19/30; C09K 19/12; C09K 19/20
(52) U.S. Cl. .............. 428/1.1; 252/299.61; 252/299.63; 252/299.66; 252/299.67
(58) Field of Search ...................... 428/1.1; 252/299.61, 252/299.63, 299.66, 299.67, 299.64

(56) References Cited

U.S. PATENT DOCUMENTS

| | | | | |
|---|---|---|---|---|
| 5,733,477 A | * | 3/1998 | Kondo et al. | 252/299.67 |
| 5,922,243 A | * | 7/1999 | Matsui et al. | 252/299.67 |
| 6,521,303 B2 | * | 2/2003 | Heckmeier et al. | 428/1.1 |
| 6,582,782 B2 | * | 6/2003 | Heckmeier et al. | 428/1.1 |

FOREIGN PATENT DOCUMENTS

| | | |
|---|---|---|
| DE | 40 00 451 | 7/1991 |
| DE | 4201711 | * 7/1993 |
| DE | 195 28 106 | 8/1996 |
| DE | 195 28 107 | 9/1996 |
| DE | 10002462 | * 8/2000 |
| EP | 0 588 568 | 9/1993 |
| EP | 0 667 555 | 8/1995 |
| EP | 0 673 986 | 9/1995 |
| JP | 07181439 | 7/1995 |
| WO | WO 91/05029 | 4/1991 |
| WO | WO 96/23851 | 8/1996 |
| WO | WO 96/28521 | 9/1996 |

* cited by examiner

Primary Examiner—Shean C. Wu
(74) Attorney, Agent, or Firm—Miller, White, Zelano & Branigan, P.C.

(57) ABSTRACT

Liquid crystalline media comprising a dielectrically positive component A, comprising compounds of formula I

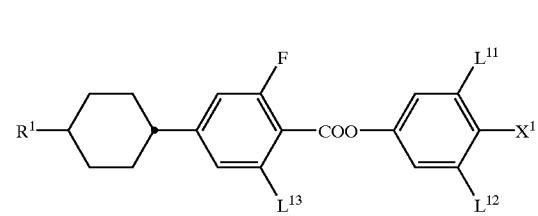

wherein the parameters have the meanings given herein, are suitable for use in liquid crystal displays, especially to active matrix displays and in particular IPS displays.

31 Claims, No Drawings

LIQUID CRYSTALLINE MEDIUM AND LIQUID CRYSTAL DISPLAY

FIELD OF THE INVENTION

The present invention relates to liquid crystalline media and to liquid crystal displays comprising these media, especially to displays addressed by an active matrix and in particular to displays of the In Plane Switching (IPS) type.

PROBLEM TO BE SOLVED AND STATE OF THE ART

Liquid Crystal Displays (LCDs) are widely used to display information. Electro-optical modes employed are, e.g., the twisted nematic (TN)-, the super twisted nematic (STN)-, the optically compensated bend (OCB)- and the electrically controlled birefringence (ECB)-mode with their various modifications, as well as others. Besides these modes, which all do use an electrical field, which is substantially perpendicular to the substrates, respectively to the liquid crystal layer, there are also electro-optical modes employing an electrical field substantially parallel to the substrates, respectively the liquid crystal layer, like, e.g., the In-Plane Switching mode (as disclosed, e.g., in DE 40 00 451 and EP 0 588 568). Especially this electrooptical mode is used for LCDs for modern desk top monitors and is envisaged to be applied for displays for multi media applications. The liquid crystals according to the present invention are preferably used in this type of displays.

For these displays new liquid crystalline media with improved properties are required. Especially the dielectric anisotropy ($\Delta\varepsilon$) should be high enough to allow a reasonably low operation voltage. Preferably $\Delta\varepsilon$ should be higher than 7 and very preferably be higher than 10, preferably, however, not higher than 25 and in particular not higher than 20. Otherwise the resistivity of the mixtures tends to become unacceptably low even for IPS displays, which do have slightly less stringent requirements in this respect than TN-AMDs. Besides this parameter, the media have to exhibit a suitably wide range of the nematic phase, a rather small birefingence ($\Delta n$), a rather small rotational viscosity and, as mentioned above, an at least a moderately high specific resistivity.

The displays according to the present invention are preferably addressed by an active matrix (active matrix LCDs, short AMDs), preferably by a matrix of thin film transistors (TFTs). However, the inventive liquid crystals can also beneficially be used in displays with other known addressing means.

There are various different display modes using composite systems of liquid crystal materials of low molecular weight together with polymeric materials such as, e.g., polymer dispersed liquid crystal (PDLC)-, nematic curvilinearily aligned phase (NCAP)- and polymer network (PN)-systems, as disclosed, for example, in WO 91/05 029 or axially symmetric microdomain (ASM) systems and others. In contrast to these, the modes especially preferred according to the instant invention are using the liquid crystal medium as such, oriented on surfaces. These surfaces typically are pretreated to achieve uniform alignment of the liquid crystal material. The display modes according to the instant invention preferably use an electrical field substantially parallel to the composite layer.

LCDs are used for direct view displays, as well as for projection type displays.

Liquid crystal compositions suitable for LCDs and especially for IPS displays are known, e.g., from JP 07-181 439 (A), EP 0 667 555, EP 0 673 986, DE 195 09 410, DE 195 28 106, DE 195 28 107, WO 96/23 851 and WO 96/28 521. These compositions, however, do have significant drawbacks. Most of them have, amongst other deficiencies, too low values of the resistivity and/or require operation voltages which are too high. Many of them also lead to unfavourably long response times.

Thus, there is a significant need for liquid crystalline media with suitable properties for practical applications such as a wide nematic phase range, low viscosities, appropriate optical anisotropy $\Delta n$, according to the display mode used, and especially a high $\Delta\varepsilon$.

PRESENT INVENTION

Surprisingly, it now has been found that liquid crystalline media with a suitably high $\Delta\varepsilon$, a suitable phase range, and a suitable $\Delta n$ can be realized, which do not exhibit the drawbacks of the materials of the prior art or at least do exhibit them to a significantly lesser degree.

These improved liquid crystalline media according to the instant application are comprising at least the following components:

a dielectrically positive component, component A, comprising one or more dielectrically positive compounds selected from formula I and preferably further comprising one or more dielectrically positive compounds selected from the group of formulae II and III

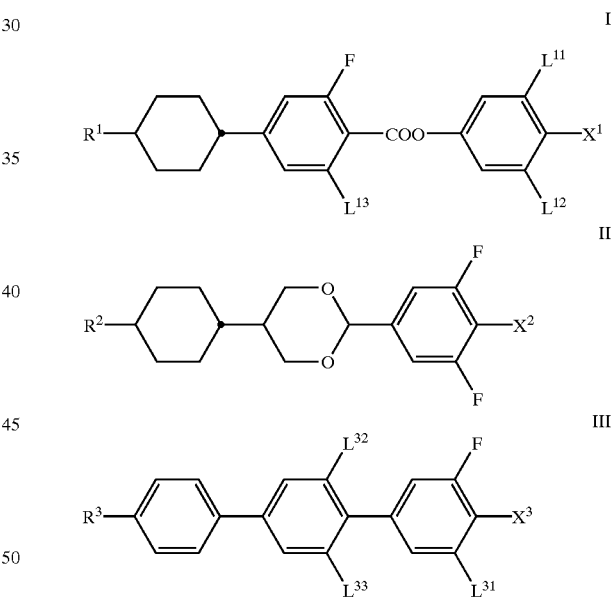

wherein
  $R^1$, $R^2$ and $R^3$ independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
  $X^1$, $X^2$ and $X^3$ independently of each other, are F or fluorinated alkyl or fluorinated alkoxy, each with 1 to 4 C-atoms,
  $L^{11}$, $L^{12}$, $L^{13}$, $L^{31}$, $L^{32}$ and $L^{33}$ are, independently of each other, H or F.
optionally a dielectrically neutral component, component B, and
also optionally a dielectrically negative component, component C.

Preferably, the dielectrically positive component, component A comprises one or more compounds each of formulae I, II and III.

Preferably, the compounds of formula II are selected from formula IIa

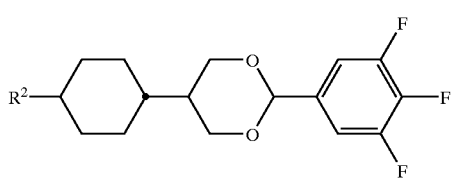

IIa wherein R² has the meaning given in formula II.

Preferably the compounds of formula III are selected from the group of compounds of formulae IIIa to IIIc.

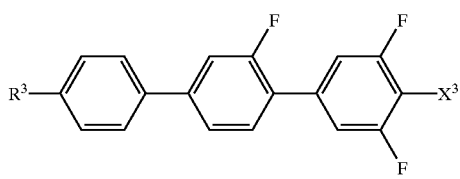

IIIa

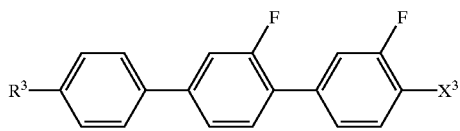

IIIb

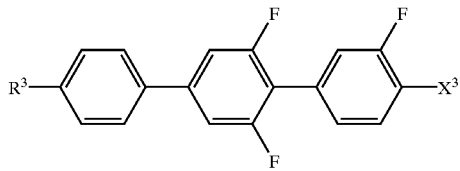

IIIc wherein R³ and X³ have the meanings given in formula III and X³ is preferably F.

Preferably, the liquid crystal mixtures according to the present invention comprise a component A which, in addition to the compounds of formula I, and, optionally, compounds of formulae II and/or III, comprise one or more compounds of formula IV

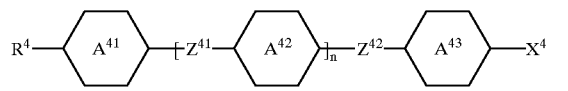

IV wherein

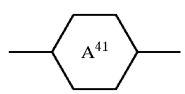 and 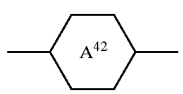

independently of each other, and in case

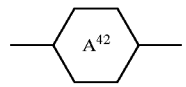

is present twice, also these, independently of each other, are

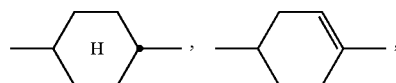

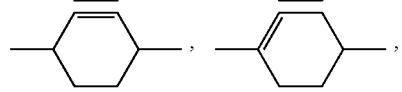

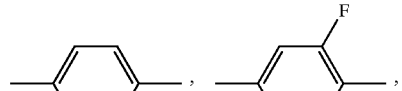

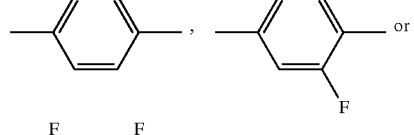

is

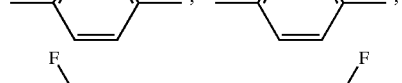

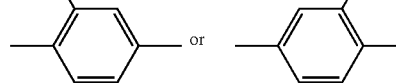

preferably at least one of

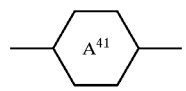 and 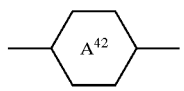

is

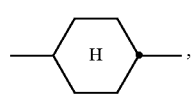

and preferably

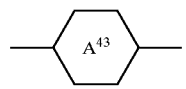 is 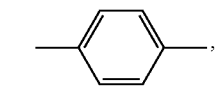

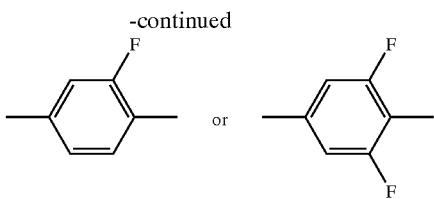 or 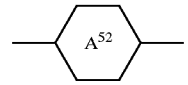

$Z^{41}$ and $Z^{42}$ are, independently of each other, and in case $Z^{41}$ is present twice, also these independently of each other, —CH$_2$CH$_2$—, —COO—, trans- CH=CH—, trans- CF=CF—, —CH$_2$O—, —CF$_2$O— or a single bond, preferably at least one of them is a single bond and most preferably, if present, at least two of them are a single bond, $X^4$ is F, Cl, halogenated alkyl, halogenated alkoxy, halogenated alkenyl or halogenated alkenyloxy, wherein halogenated preferably is fluorinated and/or chlorinated, preferably fluorinated and preferably $X^4$ is F, OCF$_3$ or OCF$_2$H, $R^4$ has one of the meanings given for $R^1$ in formula I, and n is 0, 1 or 2, preferably 0 or 1.

Especially preferred component A comprises, preferably predominantly consists of, and most preferably entirely consists of compounds selected from the group of compounds of formulae I to IV.

Preferably, the liquid crystal mixtures according to the present invention do contain at least one further component besides component A. This second component may be component B or component C, preferably the second component present is component B.

Obviously, the mixtures according to the present invention also can contain the third one of these components, component C or B, as the case may be.

Preferably, the liquid crystal mixtures according to the present invention comprise a dielectrically neutral component (component B). This component has a dielectric anisotropy in the range from −1.5 to +3 and consists of compounds which have values in this range. Preferably it comprises, preferably predominantly consists of and most preferably entirely consists of compounds of formula V

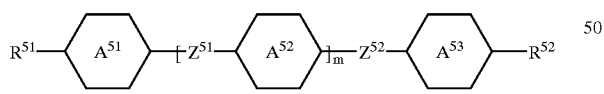

V wherein $R^{51}$ and $R^{52}$, independently of each other, have the meaning given for $R^1$ under formula I above,

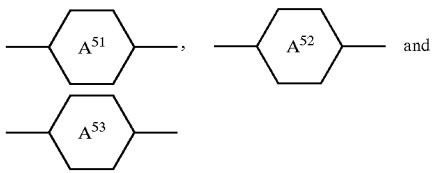

independently of each other, and in case $-\left\langle A^{52} \right\rangle-$ is present twice, also these, independently of each other, are

[structures: H-ring, cyclohexene, cyclohexane, cyclohexene, phenyl, fluorophenyl, difluorophenyl, trifluorophenyl] or

[difluorophenyl structure]

preferably at least one of $-\left\langle A^{51} \right\rangle-$, $-\left\langle A^{52} \right\rangle-$ and $-\left\langle A^{53} \right\rangle-$ is $-\left\langle H \right\rangle-$, $Z^{51}$ and $Z^{52}$ are, independently of each other, and in case $Z^{51}$ is present twice, also these independently of each other, —CH$_2$CH$_2$—, —COO—, trans- CH=CH—, trans- CF=CF—, —CH$_2$O—, —CF$_2$O— or a single bond, preferably at least one of them is a single bond and most preferably, if present, at least two of them are a single bond, m is 0, 1 or 2.

In a preferred embodiment of the present invention the liquid crystal mixtures according to the present invention comprise one or more compounds of formula IV selected from the group of compounds of formulae IVa to IVd.

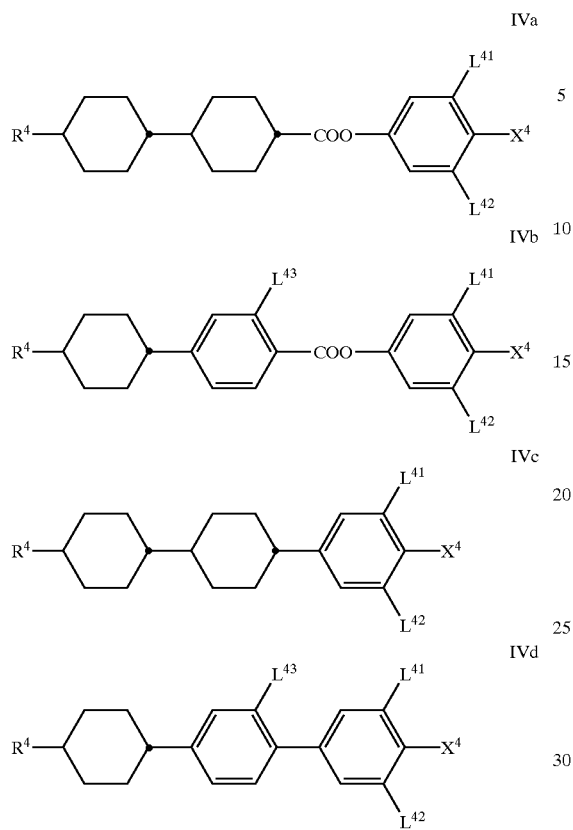

wherein

R⁴ is as defined in formula IV,

X⁴ independently of each other, is F, Cl or fluorinated alkyl or fluorinated alkoxy, each with 1 to 4 C-atoms or fluorinated alkenyl or fluorinated alkenyloxy, each with 2 to 4 C-atoms, preferably F, OCF₃ or OCF₂H, L⁴¹, L⁴² and L⁴³ are, independently of each other, H or F, preferably at least one of them is F.

Especially preferred are liquid crystal mixtures containing one or more compounds selected from the group of compounds of formulae IVa-1 to IVa-4, IVb-1 to IVb-4, IVc-1 to IVc-5 and IVd-1 to and IVd-8

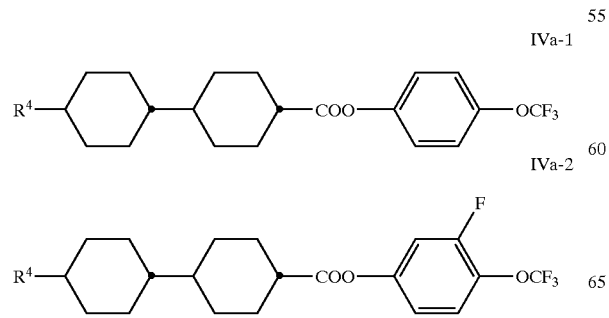

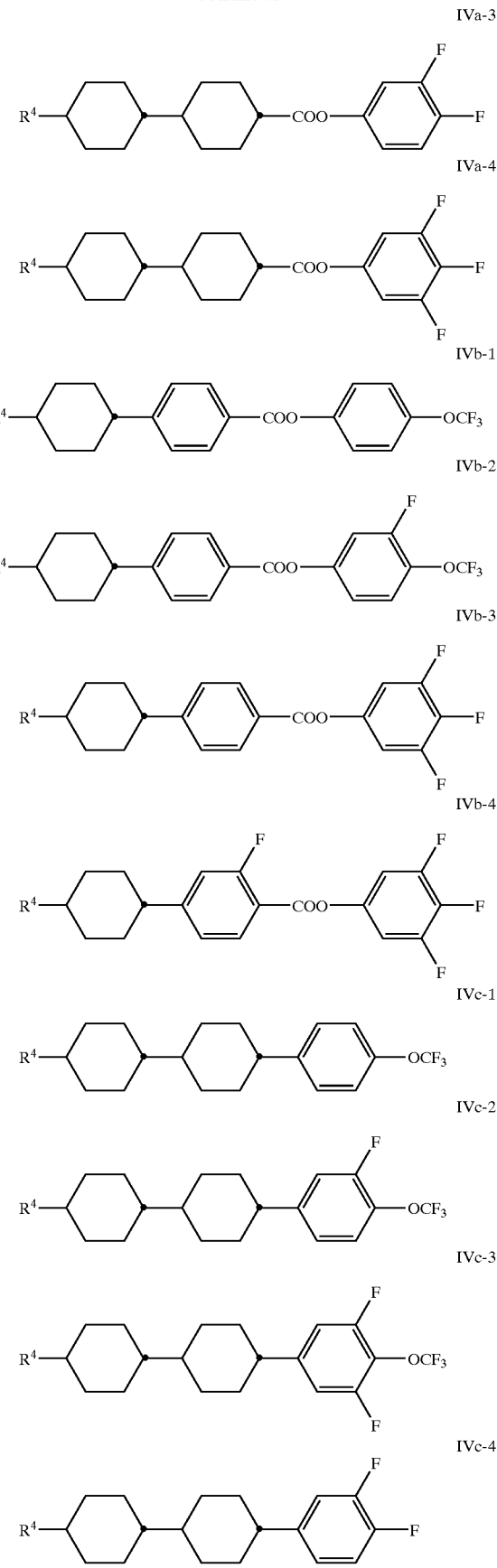

-continued

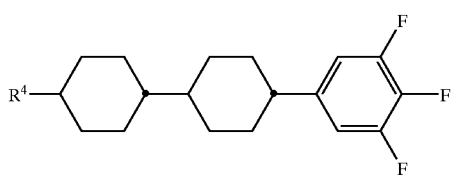
IVc-5

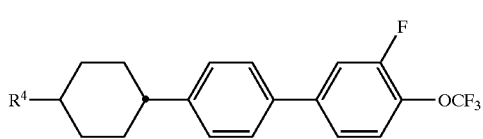
IVd-1

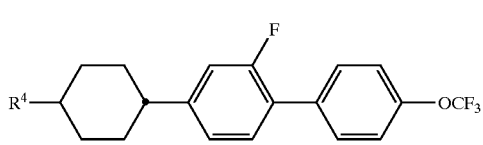
IVd-2

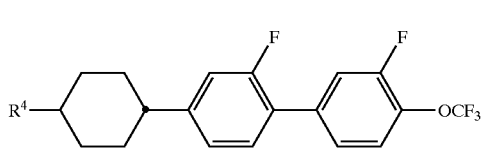
IVd-3

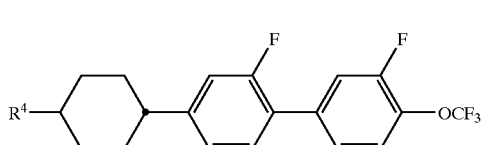
IVd-4

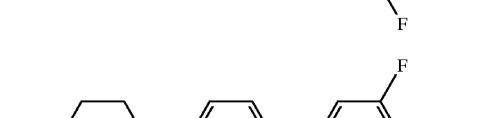
IVd-5

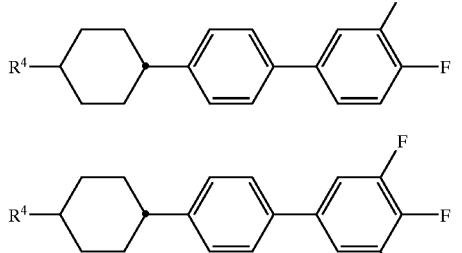
IVd-6

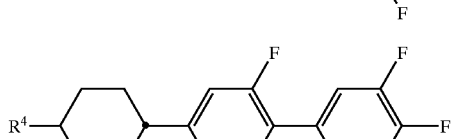
IVd-7

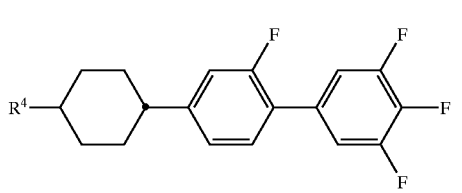
IVd-8 wherein $R^4$ has the meaning given under formula IV and preferably is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms.

In a further preferred embodiment of the present invention, which may be the same embodiment as the one mentioned above or a different one, the liquid crystal mixtures according to the present invention comprise component B comprising, preferably predominantly consisting of and most preferably entirely consisting of compounds of formula V selected from the group of compounds of formulae Va to Vc and further optionally containing compounds selected from formulae Vd to Vg

Va

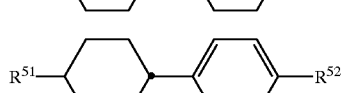
Vb

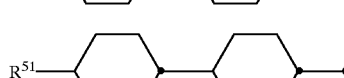
Vc

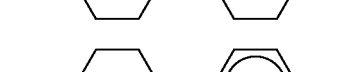
Vd

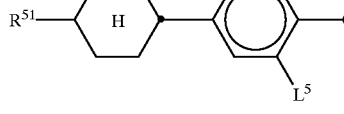
Ve

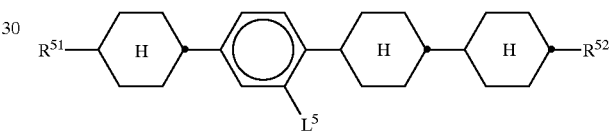
Vf

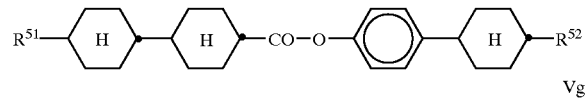
Vg

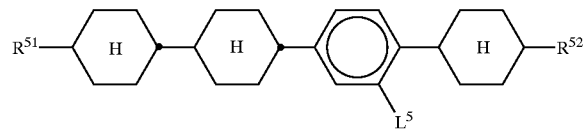

wherein $R^{51}$ and $R^{52}$ are, independently of each other, alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms and $L^5$ is H or F.

Preferably the liquid crystal mixture contains one or more compounds selected from the following group of compounds compounds of formula Va, wherein $R^{51}$ and $R^{52}$ are alkyl, compounds of formula Va, wherein $R^{51}$ is alkyl and $R^{52}$ is alkoxy, compounds of formula Va, wherein $R^{51}$ is alkyl and $R^{52}$ is alkenyl, compounds of formula Vb, wherein $R^{51}$ and $R^{52}$ are alkyl, compounds of formula Vb, wherein $R^{51}$ is alkyl and $R^{52}$ is alkoxyl, compounds of formula Vc, wherein $R^{51}$ and $R^{52}$ are alkyl, compounds of formula Vc, wherein $R^{51}$ is alkyl and $R^{52}$ is alkoxyl and compounds of formula Vc, wherein $R^{51}$ is alkyl and $R^{52}$ is alkenyl.

Especially preferred liquid crystal mixtures comprise one or more compounds of formulae Va besides one or more compounds selected from the group of formulae Vb and Vc, especially preferred are mixtures containing compounds of formula Va, wherein $R^{51}$ is alkyl and $R^{52}$ is alkoxy, Additionally, the liquid crystal mixtures according to the present invention may comprise a further optional component (component C) which has a negative dielectric anisotropy and consists of dielectrically negative compounds of formula VI

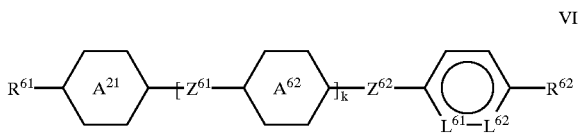

VI wherein $R^{61}$ and $R^{62}$ independently of each other have the meaning given for $R^1$ under formula I above,

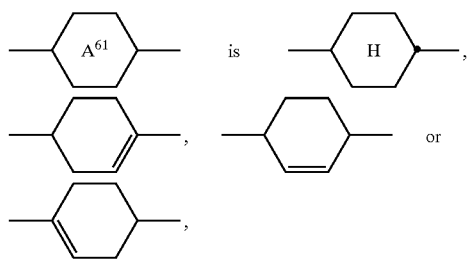

preferably

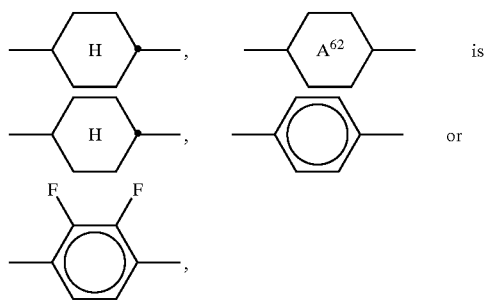

$Z^{61}$ and $Z^{62}$ are, independently of each other, —CH$_2$CH$_2$—, —COO—, trans- CH=CH—, trans- CF=CF—, —CH$_2$O—, —CF$_2$O— or a single bond, preferably at least one of them is a single bond and most preferably both are a single bond, $L^{61}$ and $L^{62}$ are, independently of each other, C—F or N, preferably at least one of them is C—F, and most preferably both of them are C—F and k is 0 or 1.

Preferably the liquid crystalline media according to the instant invention comprise, preferably predominantly consist of and most preferably entirely consist of components A to C and in particular of compounds selected from the group of compounds of formulae I to VI. Comprising in this application means in the context of compositions that the entity referred to, e.g., the medium or the component, contains the component or components or of the compound or compounds in question, preferably in a total concentration of 10% or more and most preferably of 20% or more.

Predominantly consisting, in this context, means that the entity referred to contains 55% or more, preferably 60% or more and most preferably 70% or more of the component or components or of the compound or compounds in question.

Essentially consisting, in this context, means that the entity referred to contains 80% or more, preferably 90% or more and most preferably 95% or more of the component or components or of the compound or compounds in question.

Entirely consisting, in this context, means that the entity referred to contains 98% or more, preferably 99% or more and most preferably 100.0% of the component or components or of the compound or compounds in question.

Component C preferably comprises, preferably predominantly consists of and most preferably entirely consists of one or more compounds selected from the group of compounds of formulae VIa to VIc

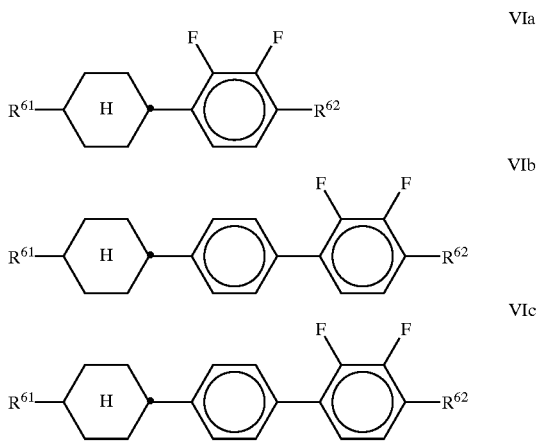

wherein $R^{61}$ and $R^{62}$ have the respective meanings given under formula VI above. In formulae VIa to VIc $R^{61}$ preferably is n-alkyl or 1-E-alkenyl and $R^{62}$ preferably is n-alkyl or alkoxy.

Also other mesogenic compounds, which are not explicitly mentioned above, can optionally and beneficially be used in the media according to the instant invention. Such compounds are known to the expert in the field.

Component A preferably is used in a concentration from 20 to 100%, preferably from 50 to 95%, further preferably from 60 to 90%, and most preferably from 70 to 80% of the total mixture.

Component B preferably is used in a concentration from 0 to 50%, more preferably from 10 to 35%, and most preferably from 20 to 30% of the total mixture.

Component C preferably is used in a concentration from 0 to 30%, more preferably from 0 to 20%, and most preferably from 5 to 15% of the total mixture.

Optionally, the inventive media can comprise further liquid crystal compounds in order to adjust the physical properties. Such compounds are known to the expert. Their concentration in the media according to the instant invention is preferably 0% to 30%, more preferably 0% to 20% and most preferably 5% to 15%.

Preferably, the liquid crystal medium contains 50% to 100%, more preferably 70% to 100%, and most preferably 80% to 100% and in particular 90% to 100% totally of components A, B and C, which contain, preferably predominantly consist of, and most preferably entirely consist of one or more of compounds of formulae I, II, III, IV, V and VI, respectively.

The liquid crystal media according to the instant invention are characterized by a clearing point of 65° C. or more, preferably of 70° C. or more and in particular of 75° C. or more.

The Δn of the liquid crystal media according to the instant invention is 0.11 or less, preferably in the range of 0.070 to 0.135, more preferably in the range of 0.080 to 0.125, most preferably in the range of 0.090 to 0.115 and in particular in the range of 0.095 to 0.110.

The Δ∈, at 1 kHz and 20° C., of the liquid crystal medium according to the invention is 8.0 or more, preferably 10.0 or more, most preferably 12.0 or more and in particular 12.5 to 18.0.

Preferably, the nematic phase of the inventive media extends at least from 0° C. to 70° C., more preferably at least from −20° C. to 70° C., most preferably at least from −30° C. to 75° C. and in particular at least from −40° C. to 75° C., wherein at least means that preferably the lower limit is under cut, wherein the upper limit is surpassed.

In the present application the term dielectrically positive means compounds or components with Δ∈>3.0, dielectrically neutral means −1.5≦Δ∈≦3.0, and dielectrically negative means Δ∈<−1.5. Δ∈ is determined at 1 kHz and 20° C. The dielectric anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 10 μm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany can be used as host mixture, respectively. The dielectric permittivities of the compounds are determined from the change of the respective values of the host mixture upon addition of the compounds of interest and are extrapolated to a concentration of the compounds of interest of 100%. Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures are given in degrees centigrade (Celsius) and all differences of temperatures in degrees centigrade. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties have been determined with test cells prepared at Merck KGaA, Germany. The test cells for the determination of Δ∈ had a cell gap of 22 μm. The electrode was a circular ITO electrode with an area of 1.13 cm$^2$ and a guard ring. The orientation layers were lecithin for homeotropic orientation (∈∥) and polyimide AL-1054 from Japan Synthetic Rubber for homogeneuous orientation (∈⊥). The capacities were determined with a frequency response analyser Solatron 1260 using a sine wave with a voltage of 0.3 $V_{rms}$. The light used in the electro-optical measurements was white light. The set up used was a commercially available equipment of Otsuka, Japan. The characteristic voltages have been determined under perpendicular observation. The threshold ($V_{10}$)—mid grey ($V_{50}$)—and saturation ($V_{90}$) voltages have been determined for 10%, 50% and 90% relative contrast, respectively.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention generally comprises several compounds, preferably of 3 to 30, more preferably of 8 to 20 and most preferably of 10 to 16 compounds. These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g., using so called pre-mixtures, which can be, e.g., homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AMD, ECB-AMD, VAN-AMD, IPS and OCB LCDs and in particular in composite systems, like PDLC, NCAP, PN LCDs and especially in ASM-PA LCDs.

The melting point T(C,N), the transition from the smectic (S) to the nematic (N) phase T(S,N) and the clearing point T (N,I) of the liquid crystals are given in degrees centigrade.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding European Patent Application No. 01123436.6, filed Sep. 28, 2001 is hereby incorporated by reference.

In the present application and especially in the following examples, the structures of the liquid crystal compounds are represented by abbreviations also called acronyms. The transformation of the abbreviations into the corresponding structures is straight forward according to the following two tables A and B. All groups $C_nH_{2n+1}$ and $C_mH_{2m+1}$ are straight chain alkyl groups with n respectively m C-atoms. The interpretation of table B is self evident. Table A does only list the abbreviations for the cores of the structures. The individual compounds are denoted by the abbreviation of the core followed by a hyphen and a code specifying the substituents $R^1$, $R^2$, $L^1$ and $L^2$ follows:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nom | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nCF$_3$ | $C_nH_{2n+1}$ | $CF_3$ | H | H |
| nCF$_3$.F | $C_nH_{2n+1}$ | $CF_3$ | H | F |
| nCF$_3$.F.F | $C_nH_{2n+1}$ | $CF_3$ | F | F |
| nOCF$_3$ | $C_nH_{2n+1}$ | $OCF_3$ | H | H |
| nOCF$_3$.F | $C_nH_{2n+1}$ | $OCF^3$ | H | F |
| nOCF$_3$.F.F | $C_nH_{2n+1}$ | $OCF_3$ | F | F |
| nOCF$_2$ | $C_nH_{2n+1}$ | $OCHF_2$ | H | H |
| nOCF$_2$.F | $C_nH_{2n+1}$ | $OCHF_2$ | H | F |
| nOCF$_2$.F.F | $C_nH_{2n+1}$ | $OCHF_2$ | F | F |
| nS | $C_nH_{2n+1}$ | NCS | H | H |
| nS.F | $C_nH_{2n+1}$ | NCS | H | F |
| nS.F.F | $C_nH_{2n+1}$ | NCS | F | F |
| rVsN | $C_rH_{2r+1}-CH=CH-C_sH_{2s}-$ | CN | H | H |
| rEsN | $C_rH_{2r+1}-O-C_sH_{2s}-$ | CN | H | H |
| nAm | $C_nH_{2n+1}$ | $COOC_mH_{2m+1}$ | H | H |

TABLE A

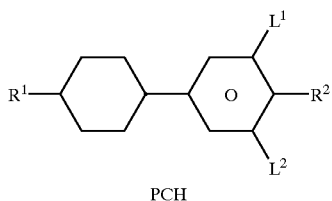

PCH

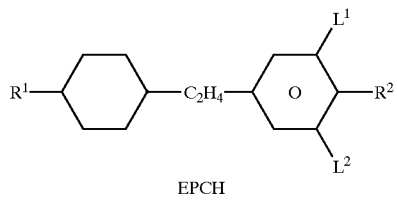

EPCH

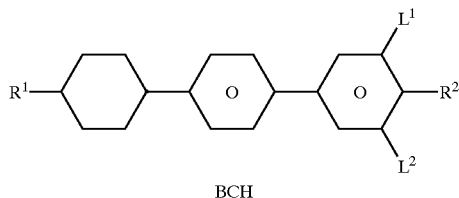

BCH

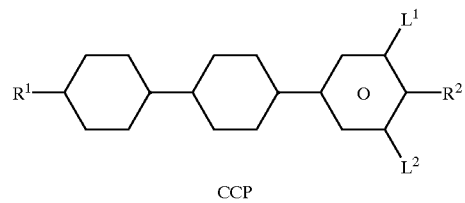

CCP

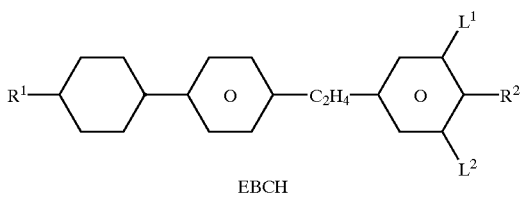

EBCH

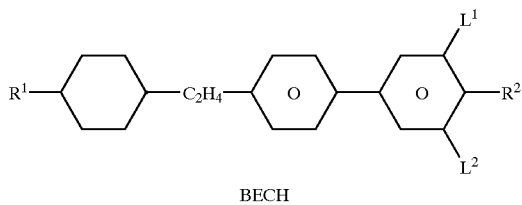

BECH

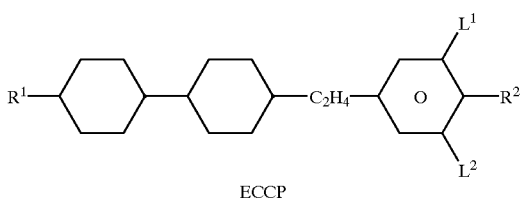

ECCP

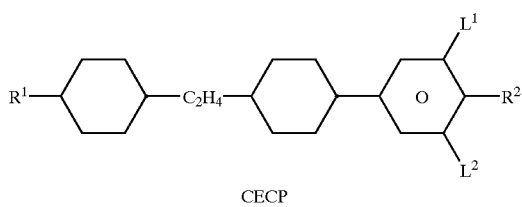

CECP

TABLE A-continued
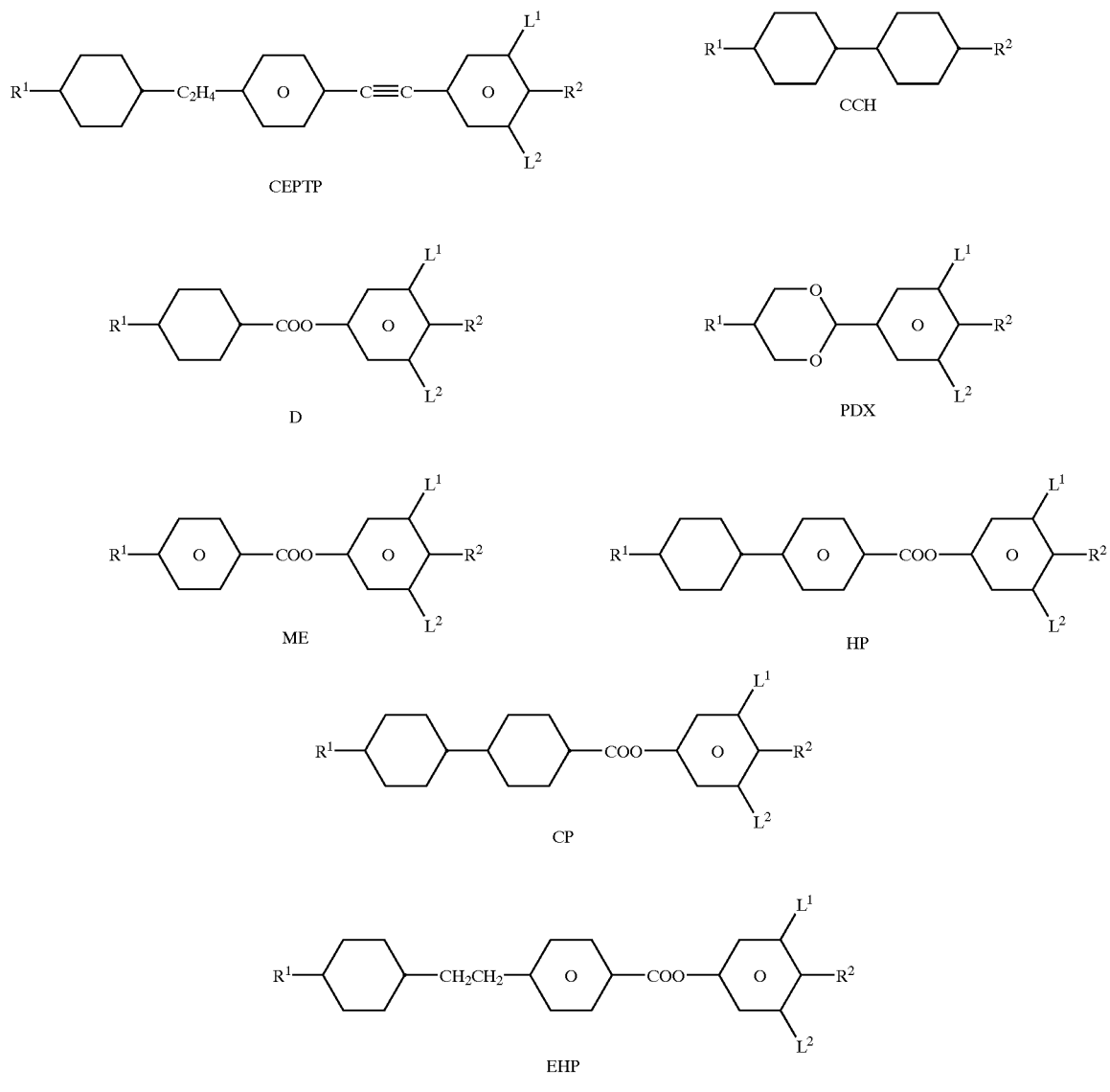
TABLE B
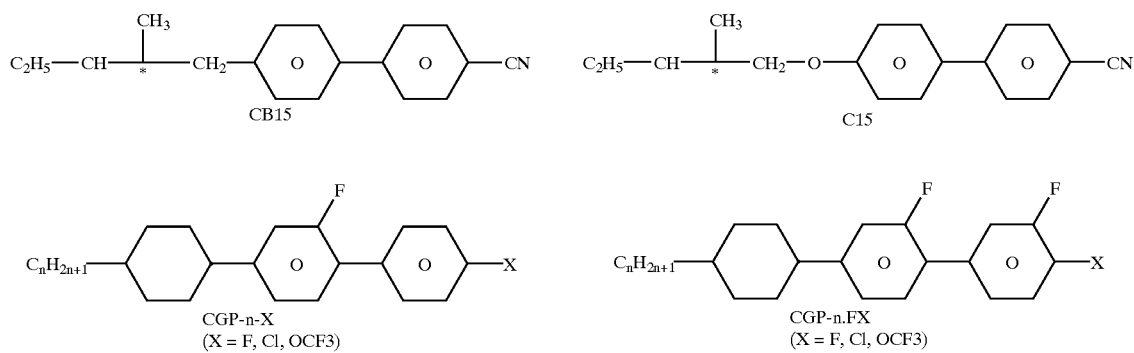

TABLE B-continued

TABLE B-continued

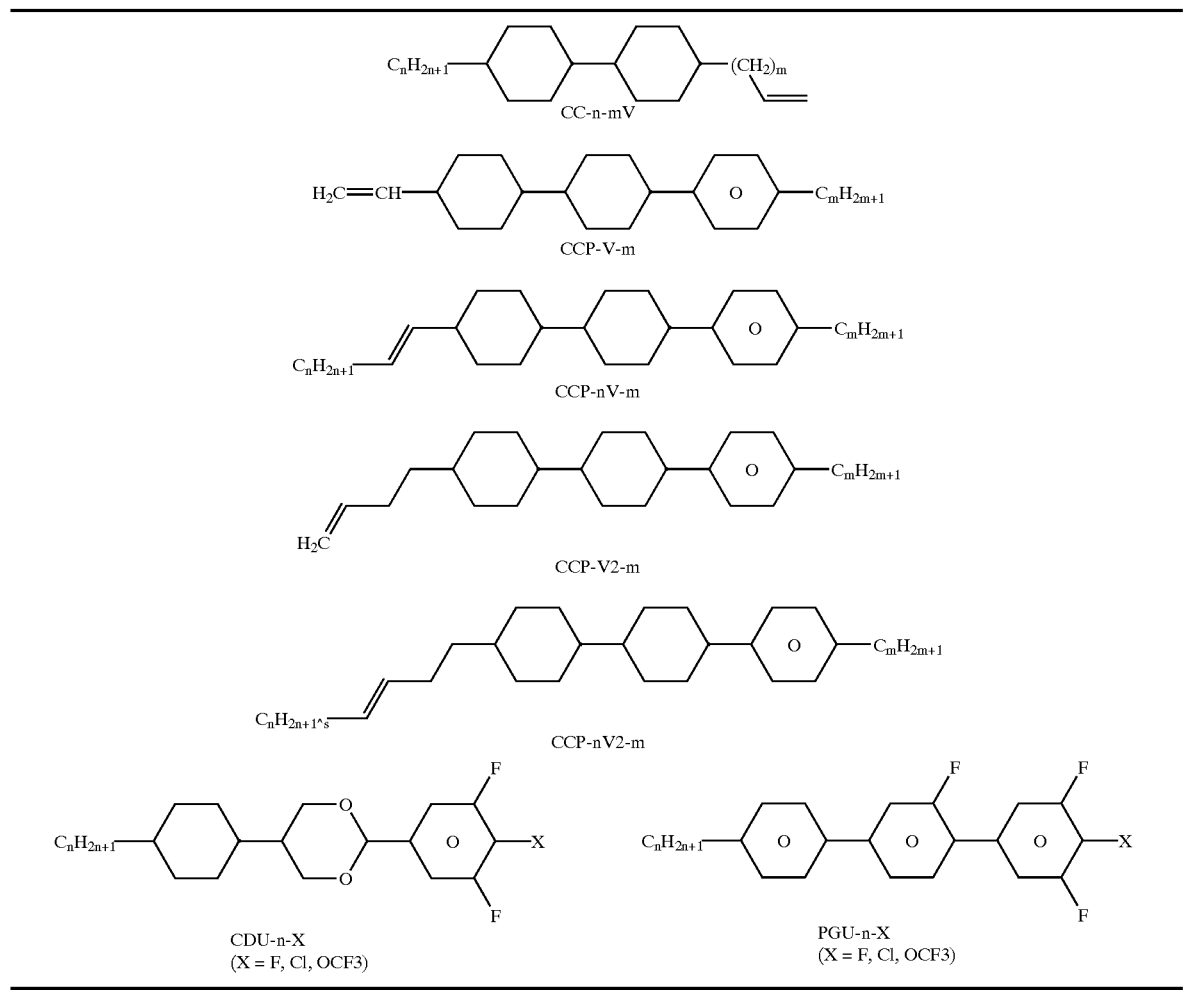

The liquid crystal media according to the instant invention do contain preferably
seven or more, preferably eight or more compounds, preferably of different formulae, selected from the group of compounds of tables A and B and/or
three or more, preferably four or more compounds, preferably of different formulae, selected from the group of compounds of table A and/or
two or more, preferably three or more compounds, preferably of different formulae, selected from the group of compounds of table B.

EXAMPLES

The examples given in the following are illustrating the present invention without limiting it in any way.

However, the physical properties compositions illustrate to the expert which properties can be achieved and in which ranges they can be modified. Especially the combination of the various properties which can be preferably achieved is thus well defined for the expert.

Example 1

A liquid crystal mixture is realized with the composition and properties given in the following table.

| Composition Compound | | | |
|---|---|---|---|
| No. | Abbreviation | Conc./% | Physical Properties |
| 1 | CDU-2-F | 11.0 | T(N,I) = 75° C. |
| 2 | CDU-3-F | 11.0 | T(S,N) = <−20° C. |
| 3 | PGU-2-F | 9.0 | $n_e$ (20° C., 589.3 nm) = 1.5841 |
| 4 | PGU-3-F | 8.5 | $\Delta n$ (20° C., 589.3 nm) = 0.1033 |
| 5 | CGZP-2-OT | 6.0 | $\epsilon_\|$ (20° C., 1 kHz) = 17.5 |
| 6 | CGZP-3-OT | 8.0 | $\Delta\epsilon$ (20° C, 1 kHz) = 12.5 |
| 7 | CCZU-3-F | 11.0 | $\gamma_1$ (20° C.) = 118 mPa · s |
| 8 | PCH-301 | 9.0 | |
| 9 | CC-5-V | 6.5 | |
| 10 | CC-3-V1 | 10.0 | |
| 11 | CP-3OCF3 | 10.0 | |
| Σ | | 100.0 | |

This mixture has a favourably low value of $\Delta n$ and a high value of $\Delta\epsilon$ and is very well suited for displays operating in the IPS mode.

Example 2

A liquid crystal mixture is realized with the composition and properties given in the following table.

| Composition Compound | | | |
|---|---|---|---|
| No. | Abbreviation | Conc./% | Physical Properties |
| 1 | CDU-2-F | 10.5 | T(N,I) = 75° C. |
| 2 | CDU-3-F | 11.0 | T(S,N) = <−20° C. |
| 3 | PGU-2-F | 10.0 | $n_e$ (20° C., 589.3 nm) = 1.5846 |
| 4 | PGU-3-F | 10.0 | $\Delta n$ (20° C., 589.3 nm) = 0.1033 |
| 5 | CGZP-2-OT | 6.5 | $\epsilon_\parallel$ (20° C., 1 kHz) = 17.3 |
| 6 | CGZP-3-OT | 7.5 | $\Delta\epsilon$ (20° C., 1 kHz) = 12.4 |
| 7 | CCZU-3-F | 9.5 | $\gamma_1$ (20° C.) = 116 mPa · s |
| 8 | PCH-301 | 9.0 | |
| 9 | CC-5-V | 6.0 | |
| 10 | CC-3-V1 | 10.0 | |
| 11 | CCP-V-1 | 4.0 | |
| 12 | CP-30CF3 | 6.0 | |
| Σ | | 100.0 | |

This mixture has a favourably low value of $\Delta n$ and a high value of $\Delta\epsilon$ and is very well suited for displays operating in the IPS mode.

Example 3

A liquid crystal mixture is realized with the composition and properties given in the following table.

| Composition Compound | | | |
|---|---|---|---|
| No. | Abbreviation | Conc./% | Physical Properties |
| 1 | CDU-2-F | 10.0 | T(N,I) = 75° C. |
| 2 | CDU-3-F | 10.0 | T(S,N) = <−20° C. |
| 3 | PGU-2-F | 10.0 | $n_e$ (20° C., 589.3 nm) = 1.5828 |
| 4 | PGU-3-F | 10.0 | $\Delta n$ (20° C., 589.3 nm) = 0.1033 |
| 5 | CGZP-2-OT | 7.0 | $\epsilon_\parallel$ (20° C., 1 kHz) = 17.2 |
| 6 | CGZP-3-OT | 8.0 | $\Delta\epsilon$ (20° C., 1 kHz) = 12.5 |
| 7 | CCZU-3-F | 9.0 | $\gamma_1$ (20° C.) = 96 mPa · s |
| 8 | CC-3-V | 17.0 | |
| 9 | CC-3-V1 | 10.0 | |
| 10 | CP-30CF3 | 9.0 | |
| Σ | | 100.0 | |

This mixture has a favourably low value of $\Delta n$ and a high value of $\Delta\epsilon$ and is very well suited for displays operating in the IPS mode.

Example 4

A liquid crystal mixture is realized with the composition and properties given in the following table.

| Composition Compound | | | |
|---|---|---|---|
| No. | Abbreviation | Conc./% | Physical Properties |
| 1 | CDU-2-F | 10.50 | T(N,I) = 75° C. |
| 2 | CDU-3-F | 11.00 | T(S,N) = <−20° C. |
| 3 | PGU-2-F | 10.25 | $n_e$ (20° C., 589.3 nm) = 1.5846 |
| 4 | PGU-3-F | 10.00 | $\Delta n$ (20° C., 589.3 nm) = 0.1032 |
| 5 | CGZP-2-OT | 5.00 | $\epsilon_\parallel$ (20° C., 1 kHz) = 17.3 |
| 6 | CGZP-3-OT | 7.75 | $\Delta\epsilon$ (20° C., 1 kHz) = 12.5 |
| 7 | CCZU-3-F | 10.50 | $\gamma_1$ (20° C.) = 106 mPa · s |
| 8 | CCH-501 | 4.50 | |
| 9 | CC-5-V | 11.0 | |
| 10 | CC-3-V1 | 3.0 | |
| 11 | CCP-V-1 | 3.00 | |
| 12 | CCP-30CF3 | 3.50 | |
| 13 | CP-30CF3 | 3.00 | |
| Σ | | 100.0 | |

This mixture has a favourably low value of $\Delta n$ and a high value of $\Delta\epsilon$ and is very well suited for displays operating in the IPS mode.

Example 5

A liquid crystal mixture is realized with the composition and properties given in the following table.

| Composition Compound | | | |
|---|---|---|---|
| No. | Abbreviation | Conc./% | Physical Properties |
| 1 | CDU-2-F | 10.0 | T(N,I) = 75° C. |
| 2 | CDU-3-F | 11.0 | T(S,N) = <−30° C. |
| 3 | PGU-2-F | 10.0 | $n_e$ (20° C., 589.3 nm) = 1.5862 |
| 4 | PGU-3-F | 10.0 | $\Delta n$ (20° C., 589.3 nm) = 0.1042 |
| 5 | CGZP-2-OT | 7.0 | $\epsilon_\parallel$ (20° C., 1 kHz) = 17.5 |
| 6 | CGZP-3-OT | 8.0 | $\Delta\epsilon$ (20° C., 1 kHz) = 12.6 |
| 7 | CCZU-3-F | 9.0 | |
| 8 | CCH-501 | 9.0 | |
| 9 | CC-5-V | 6.0 | |
| 10 | CC-3-V1 | 10.0 | |
| 11 | CCP-V-1 | 5.0 | |
| 12 | CP-30CF3 | 3.0 | |
| Σ | | 100.0 | |

This mixture has a favourably low value of $\Delta n$ and a high value of $\Delta\epsilon$ and is very well suited for displays operating in the IPS mode.

Example 6

A liquid crystal mixture is realized with the composition and properties given in the following table.

| Composition Compound | | | |
|---|---|---|---|
| No. | Abbreviation | Conc./% | Physical Properties |
| 1 | CDU-2-F | 10.0 | T(N,I) = 75° C. |
| 2 | CDU-3-F | 11.0 | T(S,N) = <−30° C. |
| 3 | PGU-2-F | 9.0 | $n_e$ (20° C., 589.3 nm) = 1.5854 |
| 4 | PGU-3-F | 9.0 | $\Delta n$ (20° C., 589.3 nm) = 0.1044 |
| 5 | CGZP-2-OT | 7.0 | $\epsilon_\parallel$ (20° C., 1 kHz) = 17.5 |
| 6 | CGZP-3-OT | 8.0 | $\Delta\epsilon$ (20° C., 1 kHz) = 12.5 |
| 7 | CCZU-3-F | 10.0 | |
| 8 | PCH-501 | 9.0 | |
| 9 | CC-5-V | 7.0 | |

-continued

| | Composition Compound | | |
|---|---|---|---|
| No. | Abbreviation | Conc./% | Physical Properties |
| 10 | CC-3-V1 | 10.0 | |
| 11 | CP-30CF3 | 10.0 | |
| Σ | | 100.0 | |

This mixture has a favourably low value of $\Delta n$ and a high value of $\Delta\epsilon$ and is very well suited for displays operating in the IPS mode.

Example 7

A liquid crystal mixture is realized with the composition and properties given in the following table.

| | Composition Compound | | |
|---|---|---|---|
| No. | Abbreviation | Conc./% | Physical Properties |
| 1 | CDU-2-F | 11.0 | T(N,I) = 75° C. |
| 2 | CDU-3-F | 11.0 | T(S,N) = <−20° C. |
| 3 | PGU-2-F | 10.0 | $n_e$ (20° C., 589.3 nm) = 1.5832 |
| 4 | PGU-3-F | 10.0 | $\Delta n$ (20° C., 589.3 nm) = 0.1020 |
| 5 | CGZP-2-OT | 3.0 | $\epsilon_\parallel$ (20° C., 1 kHz) = 17.1 |
| 6 | CGZP-3-OT | 8.0 | $\Delta\epsilon$ (20° C., 1 kHz) = 12.5 |
| 7 | CCZU-3-F | 12.0 | $\gamma_1$ (20° C.) = 102 mPa · s |
| 8 | CC-5-V | 16.0 | |
| 9 | CC-3-V1 | 10.0 | |
| 10 | CCP-V-1 | 2.0 | |
| 11 | CP-30CF3 | 7.0 | |
| Σ | | 100.0 | |

This mixture has a favourably low value of $\Delta n$ and a high value of $\Delta\epsilon$ and is very well suited for displays operating in the IPS mode.

Example 8

A liquid crystal mixture is realized with the composition and properties given in the following table.

| | Composition Compound | | |
|---|---|---|---|
| No. | Abbreviation | Conc./% | Physical Properties |
| 1 | CDU-2-F | 10.5 | T(N,I) = 75° C. |
| 2 | CDU-3-F | 11.0 | T(S,N) = <−20° C. |
| 3 | PGU-2-F | 10.5 | $n_e$ (20° C., 589.3 nm) = 1.5832 |
| 4 | PGU-3-F | 10.0 | $\Delta n$ (20° C., 589.3 nm) = 0.1033 |
| 5 | CGZP-2-OT | 3.5 | $\epsilon_\parallel$ (20° C., 1 kHz) = 17.1 |
| 6 | CGZP-3-OT | 8.0 | $\Delta\epsilon$ (20° C., 1 kHz) = 12.5 |
| 7 | CCZU-3-F | 11.5 | $\gamma_1$ (20° C.) = 103 mPa · s |
| 8 | CC-5-V | 16.0 | |
| 9 | CC-3-V1 | 10.0 | |
| 10 | CCP-V-1 | 2.0 | |
| 11 | CP-30CF3 | 7.0 | |
| Σ | | 100.0 | |

This mixture has a favourably low value of $\Delta n$ and a high value of $\Delta\epsilon$ and is very well suited for displays operating in the IPS mode.

Example 9

A liquid crystal mixture is realized with the composition and properties given in the following table.

| | Composition Compound | | |
|---|---|---|---|
| No. | Abbreviation | Conc./% | Physical Properties |
| 1 | CDU-2-F | 10.0 | T(N,I) = 75° C. |
| 2 | CDU-3-F | 11.0 | T(S,N) = <−20° C. |
| 3 | PGU-2-F | 10.0 | $n_e$ (20° C., 589.3 nm) = 1.5843 |
| 4 | PGU-3-F | 10.0 | $\Delta n$ (20° C., 589.3 nm) = 0.1033 |
| 5 | CGZP-2-OT | 6.0 | $\epsilon_\parallel$ (20° C., 1 kHz) = 17.1 |
| 6 | CGZP-3-OT | 8.0 | $\Delta\epsilon$ (20° C., 1 kHz) = 12.2 |
| 7 | CCZU-3-F | 8.5 | |
| 8 | CCH-501 | 9.0 | |
| 9 | CC-5-V | 7.0 | |
| 10 | CC-3-V1 | 10.0 | |
| 11 | CCP-V-1 | 4.0 | |
| 12 | CP-30CF3 | 6.5 | |
| Σ | | 100.0 | |

This mixture has a favourably low value of $\Delta n$ and a high value of $\Delta\epsilon$ and is very well suited for displays operating in the IPS mode.

Example 10

A liquid crystal mixture is realized with the composition and properties given in the following table.

| | Composition Compound | | |
|---|---|---|---|
| No. | Abbreviation | Conc./% | Physical Properties |
| 1 | CDU-2-F | 11.0 | T(N,I) = 74° C. |
| 2 | CDU-3-F | 11.0 | T(S,N) = <−20° C. |
| 3 | PGU-2-F | 9.0 | $n_e$ (20° C., 589.3 nm) = 1.5841 |
| 4 | PGU-3-F | 8.5 | $\Delta n$ (20° C., 589.3 nm) = 0.1030 |
| 5 | CGZP-2-OT | 7.0 | $\epsilon_\parallel$ (20° C., 1 kHz) = 17.5 |
| 6 | CGZP-3-OT | 7.0 | $\Delta\epsilon$ (20° C., 1 kHz) = 12.5 |
| 7 | CCZU-3-F | 11.0 | |
| 8 | PCH-301 | 9.0 | |
| 9 | CC-5-V | 6.5 | |
| 10 | CC-3-V1 | 10.0 | |
| 11 | CP-30CF3 | 10.0 | |
| Σ | | 100.0 | |

This mixture has a favourably low value of $\Delta n$ and a high value of $\Delta\epsilon$ and is very well suited for displays operating in the IPS mode.

Example 11

A liquid crystal mixture is realized with the composition and properties given in the following table.

| | Composition Compound | | |
|---|---|---|---|
| No. | Abbreviation | Conc./% | Physical Properties |
| 1 | CDU-2-F | 10.0 | T(N,I) = 76° C. |
| 2 | CDU-3-F | 10.0 | T(S,N) = <−20° C. |

-continued

| Composition Compound | | | |
|---|---|---|---|
| No. | Abbreviation | Conc./% | Physical Properties |
| 3 | PGU-2-F | 10.0 | $n_e$ (20° C., 589.3 nm) = 1.5824 |
| 4 | PGU-3-F | 10.0 | $\Delta n$ (20° C., 589.3 nm) = 0.1030 |
| 5 | CGZP-2-OT | 6.0 | $\epsilon_\parallel$ (20° C., 1 kHz) = 17.0 |
| 6 | CGZP-3-OT | 8.0 | $\Delta \epsilon$ (20° C., 1 kHz) = 12.3 |
| 7 | CCZU-3-F | 9.0 | |
| 8 | CC-3-V | 17.0 | |
| 9 | CC-3-V1 | 10.0 | |
| 10 | CP-30CF3 | 10.0 | |
| Σ | | 100.0 | |

This mixture has a favourably low value of Δn and a high value of Δ∈ and is very well suited for displays operating in the IPS mode.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid crystal medium comprising a dielectrically positive component A which comprises one or more dielectrically positive compounds of formula I

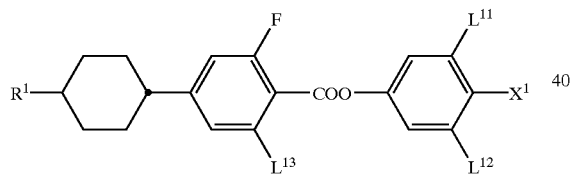

wherein $R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^1$ is F or fluorinated alkyl or fluorinated alkoxy, each with 1 to 4 C-atoms, and $L^{11}$, $L^{12}$ and $L^{13}$ are, independently of each other, H or F, and wherein said dielectrically positive component A further comprises one or more dielectrically positive compounds selected from the group of compounds of formulae II and III

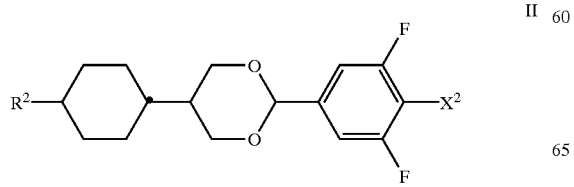

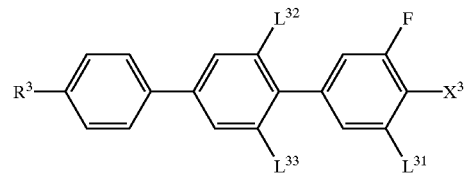

wherein $R^2$ and $R^3$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^2$ and $X^3$ independently of each other, are F or fluorinated alkyl or fluorinated alkoxy, each with 1 to 4 C-atoms, and $L^{31}$, $L^{32}$ and $L^{33}$ are, independently of each other, H or F.

2. A liquid crystal medium according to claim 1, further comprising one or more compounds of formula IV

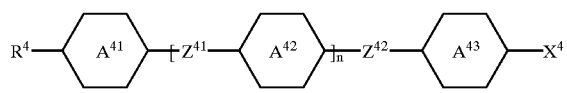

wherein

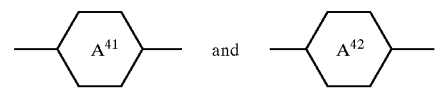

independently of each other, and in case

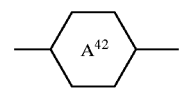

is present twice, also these, independently of each other, are

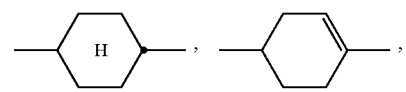

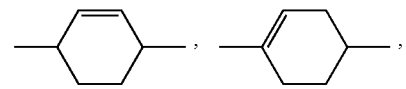

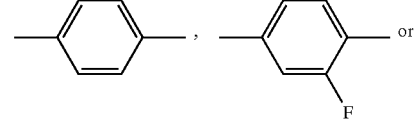

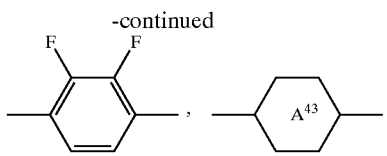

is

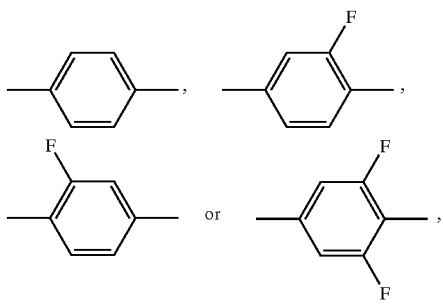

$Z^{41}$ and $Z^{42}$ are, independently of each other, and in case $Z^{41}$ is present twice, also these independently of each other, —CH$_2$CH$_2$—, —COO—, trans- CH=CH—, trans —CF=CF—, —CH$_2$O—, —CF$_2$O— or a single bond, $X^4$ is F, Cl, halogenated alkyl, halogenated alkoxy, halogenated alkenyl or halogenated alkenyloxy, $R^4$ is alkyl, alkoxy, fluorinated alkyl or fluorinated alkoxy with 1 to 7 C-atoms atoms, alkenyl, alkenyloxy, alkoxyalkyl or fluorinated alkenyl with 2 to 7 C-atoms, and n is 0, 1 or 2.

3. A liquid crystal medium according to claim 2, wherein $X^4$ is F, OCF$_3$ or OCF$_2$H.

4. A liquid crystal medium according to claim 2, wherein $X^4$ is F, Cl, fluorinated and/or chlorinated alkyl, fluorinated and/or chlorinated alkoxy, fluorinated and/or chlorinated alkenyl or fluorinated and/or chlorinated alkenyloxy.

5. A Liquid crystal medium according to claim 1, further comprising a dielectrically neutral component B comprising one or more compounds of formula V

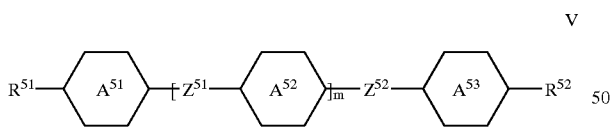

wherein $R^{51}$ and $R^{52}$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

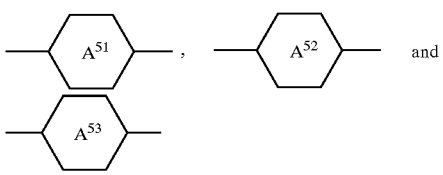

independently of each other, and in case

is present twice, also these, independently of each other, are

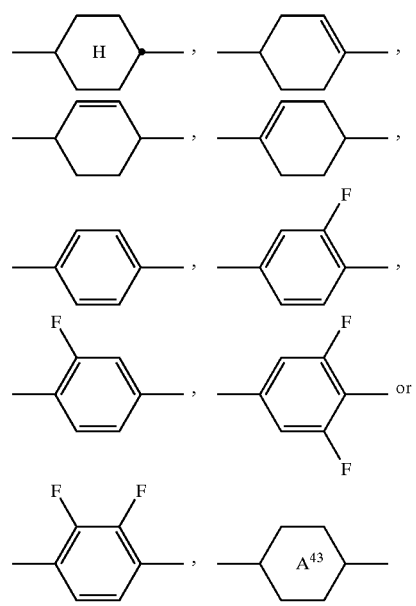

$Z^{51}$ and $Z^{52}$ are, independently of each other, and in case $Z^{51}$ is present twice, also these independently of each other, —CH$_2$CH$_2$, —COO—, trans- CH=CH—, trans- CF=CF—, —CH$_2$O—, —CF$_2$O— or a single bond, and m is 0, 1 or 2.

6. A Liquid crystal medium according to claim 2, further comprising a dielectrically neutral component B comprising one or more compounds of formula V

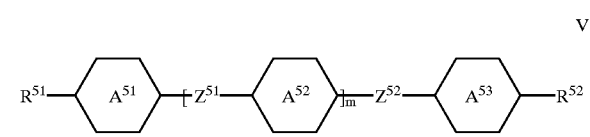

wherein $R^{51}$ and $R^{52}$, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

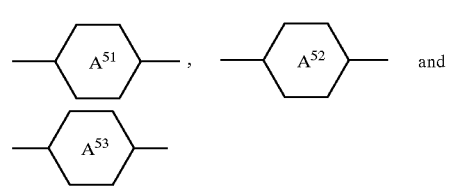

independently of each other, and in case

is present twice, also these, independently of each other, are

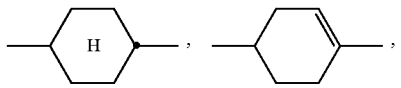

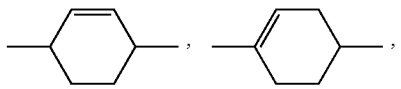

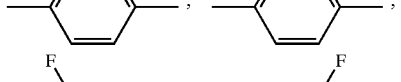

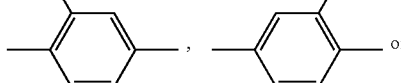

$Z^{51}$ and $Z^{52}$ are, independently of each other, and in case $Z^{51}$ is present twice, also these independently of each other, —CH$_2$CH$_2$—, —COO—, trans- CH=CH—, trans- —CF=CF—, —CH$_2$O—, —CF$_2$O— or a single bond, and m is 0, 1 or 2.

7. A liquid crystal medium according to claim 1, further comprising a dielectrically negative component C.

8. A liquid crystal medium according to claim 7, wherein dielectrically negative component C comprises dielectrically negative compounds of formula VI

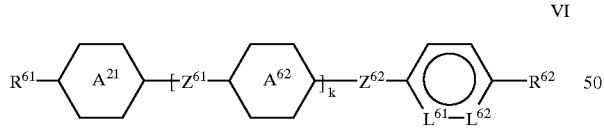

wherein $R^{61}$ and $R^{62}$ independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

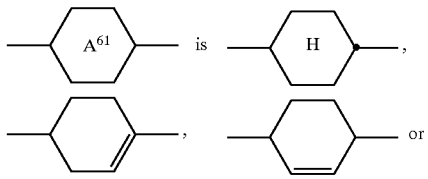

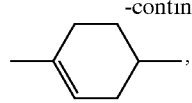

 is ,

, or $Z^{61}$ and $Z^{62}$ are, independently of each other, —CH$_2$CH$_2$—, —COO—, trans- CH=CH—, trans- —CF=CF—, —CH$_2$O—, —CF$_2$O— or a single bond, $L^{61}$ and $L^{62}$ are, independently of each other, C—F or N, and k is 0 or 1.

9. A liquid crystal medium according to claim 1, wherein said medium comprises one or more compounds of formula IIa IIa

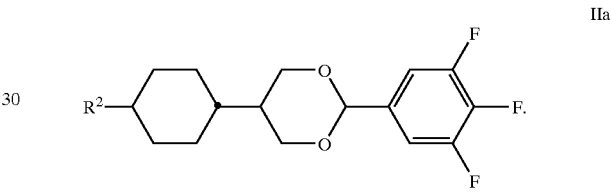

10. A liquid crystal medium according to claim 2, wherein said medium comprises one or more compounds selected from the group of compounds of formulae IIIa to IIIc IIIa

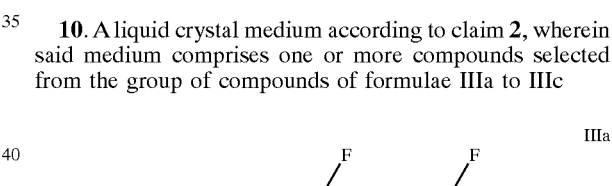

IIIb

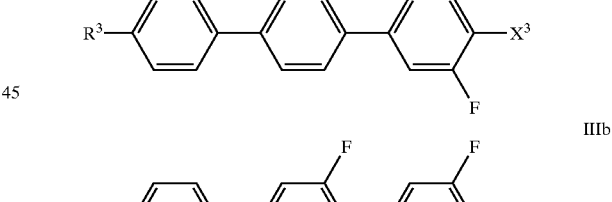

IIIc

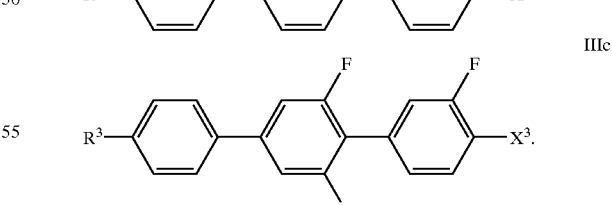

11. In a liquid crystal display comprising a liquid crystal medium, the improvement wherein said medium is according to claim 1.

12. A liquid crystal display according to claim 11, wherein said medium is addressed by an active matrix.

13. In a method of generating an electrooptical effect using a liquid crystal display, the improvement wherein said display is according to claim 11.

14. A liquid crystal medium according to claim 8, wherein

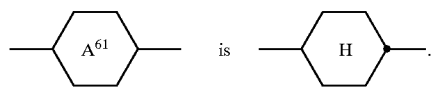.

15. A liquid crystal medium comprising a dielectrically positive component A which comprises one or more dielectrically positive compounds of formula I

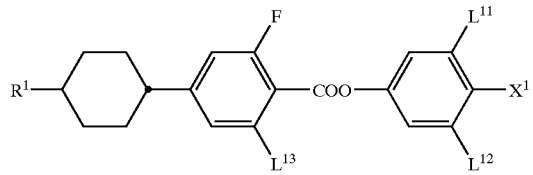

wherein
$R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
$X^1$ is F or fluorinated alkyl or fluorinated alkoxy, each with 1 to 4 C-atoms, and
$L^{11}$, $L^{12}$ and $L^{13}$ are, independently of each other, H or F; and
said medium further comprises a dielectrically negative component C.

16. A liquid crystal medium according to claim 15, wherein dielectrically negative component C comprises dielectrically negative compounds of formula VI

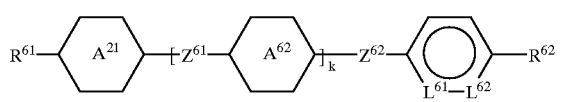

wherein
$R^{61}$ and $R^{62}$ independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,

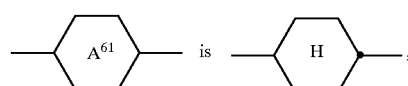

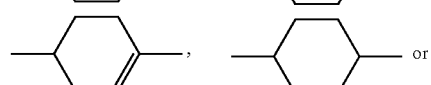

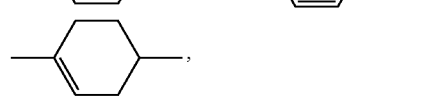

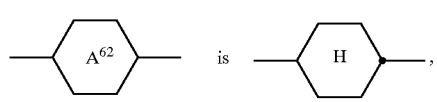

-continued

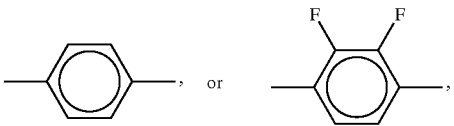

$Z^{61}$ and $Z^{62}$ are, independently of each other, —CH$_2$CH$_2$—, —COO—, trans- CH=CH—, trans- —CF=CF—, —CH$_2$O—, —CF$_2$O— or a single bond,
$L^{61}$ and $L^{62}$ are, independently of each other, C—F or N, and
k is 0 or 1.

17. A liquid crystal medium according to claim 16, wherein

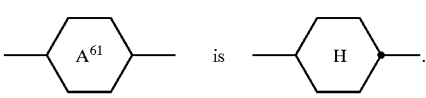.

18. A liquid crystal medium comprising a dielectrically positive component A which comprises one or more dielectrically positive compounds of formula I

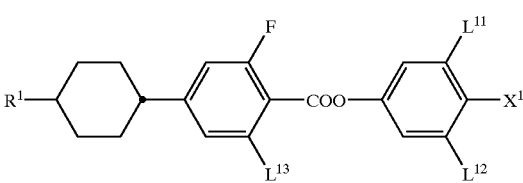

wherein
$R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
$X^1$ is F or fluorinated alkyl or fluorinated alkoxy, each with 1 to 4 C-atoms, and
$L^{11}$, $L^{12}$ and $L^{13}$ are, independently of each other, H or F; and said medium further comprising one or more compounds of formula IV

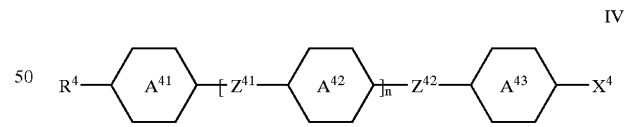

wherein

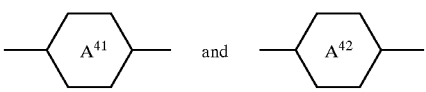

independently of each other, and in case

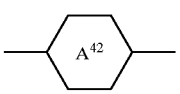

is present twice, also these, independently of each other, are

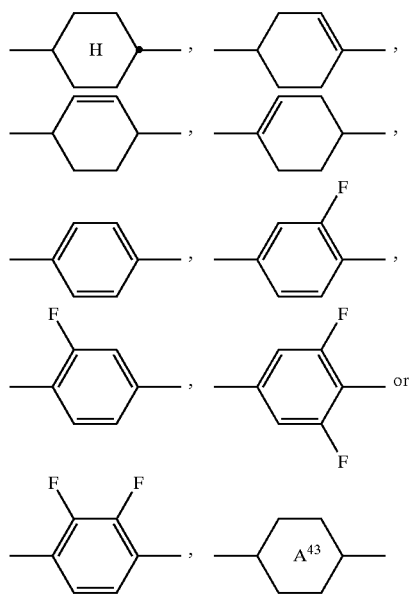

is

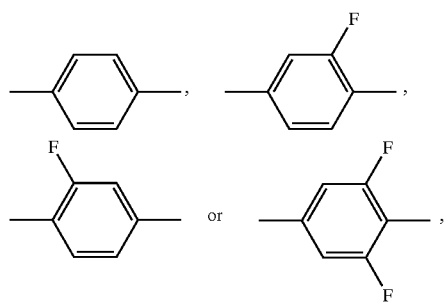

$Z^{41}$ and $Z^{42}$ are, independently of each other, and in case $Z^{41}$ is present twice, also these independently of each other, —CH$_2$CH$_2$—, —COO—, trans- CH=CH—, trans- —CF=CF—, —CH$_2$O—, —CF$_2$O— or a single bond, $X^4$ is F, Cl, halogenated alkyl, halogenated alkoxy, halogenated alkenyl or halogenated alkenyloxy, $R^4$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and n is 0, 1 or 2; and said medium comprises one or more compounds selected from the group of compounds of formulae IIIa to IIIc

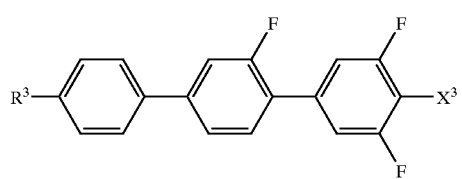    IIIa

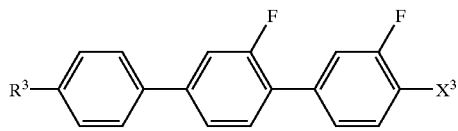    IIIb

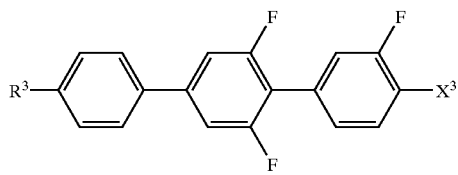    IIIc wherein
$R^3$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and $X^3$ is F or fluorinated alkyl or fluorinated alkoxy, each with 1 to 4 C-atoms.

19. A liquid crystal medium according to claim 1, wherein said medium comprises one or more compounds selected from the group of compounds of formulae IIIa to IIIc

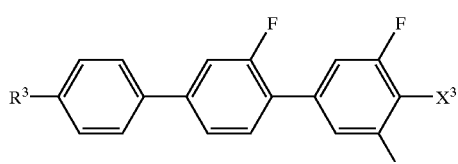    IIIa

    IIIb

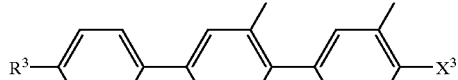    IIIc

20. A liquid crystal medium comprising a dielectrically positive component A which comprises one or more dielectrically positive compounds of formula I

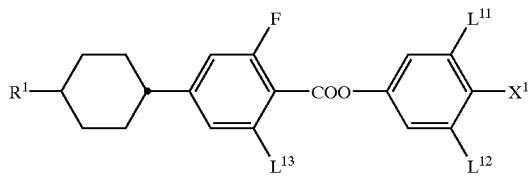    I wherein
$R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^1$ is F or fluorinated alkyl or fluorinated alkoxy, each with 1 to 4 C-atoms, and $L^{11}$, $L^{12}$ and $L^{13}$ are, independently of each other, H or F, and wherein said dielectrically positive component A further comprises one or more dielectrically positive compounds selected from formula II

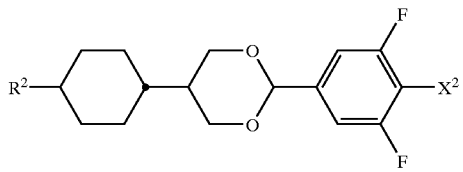

II wherein $R^2$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^2$ is F or fluorinated or fluorinated alkoxy, each with 1 to 4 C-atoms.

21. A liquid crystal medium according to claim 20, further comprising one or more compounds of formula IV

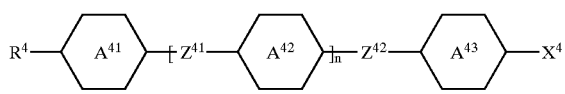

IV wherein

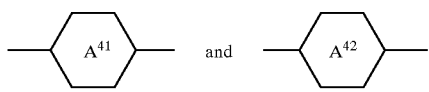 and 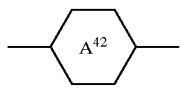

independently of each other, and in case

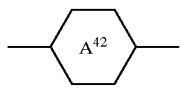

is present twice, also these, independently of each other, are

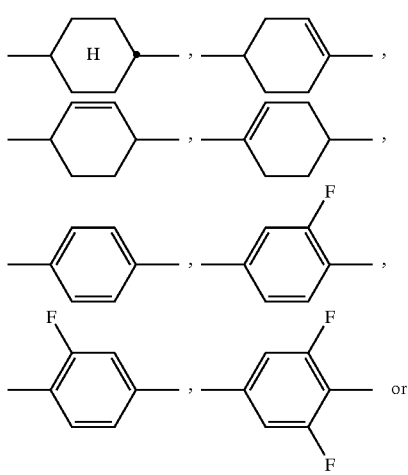

-continued

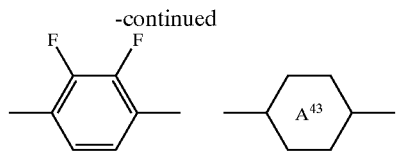

is

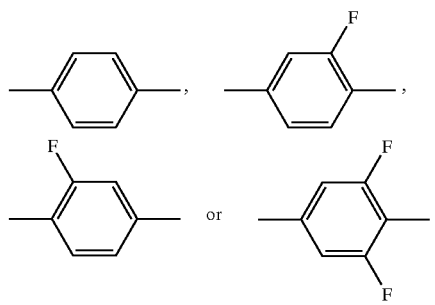

$Z^{41}$ and $Z^{42}$ are, independently of each other, and in case $Z^{41}$ is present twice, also these independently of each other, —$CH_2CH_2$—, —COO—, tran- CH=CH—, trans- —CF=CF—, —$CH_2O$—, —$CF_2O$— or a single bond, $X^4$ is F, Cl, halogenated alkyl, halogenated alkoxy, halogenated alkenyl or halogenated alkenyloxy, $R^4$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and n is 0, 1 or 2.

22. A liquid crystal medium according to claim 21, wherein $X^4$ is F, $OCF_3$ or $OCF_2H$.

23. A liquid crystal medium according to claim 21, wherein $X^4$ is F, Cl, fluorinated and/or chlorinated alkyl, fluorinated and/or chlorinated alkoxy, fluorinated and/or chlorinated alkenyl or fluorinated and/or chlorinated alkenyloxy.

24. A liquid crystal medium comprising a dielectrically positive component A which comprises one or more dielectrically positive compounds of formula I

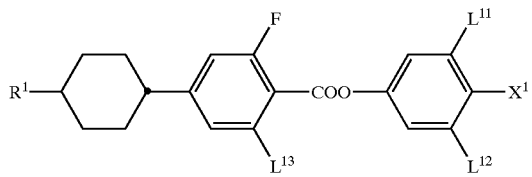

I wherein $R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^1$ is F or fluorinated alkyl or fluorinated alkoxy, each with 1 to 4 C-atoms, and $L^{11}$, $L^{12}$ and $L^{13}$ are, independently of each other, H or F, and wherein said dielectrically positive component A further comprises one or more dielectrically positive compounds selected from formula III

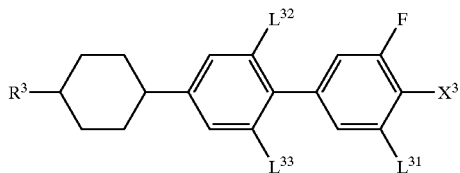

wherein $R^2$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^2$ is F or fluorinated alkyl or fluorinated alkoxy, each with 1 to 4 C-atoms, and $L^{31}$, $L^{32}$ and $L^{33}$ are, independently of each other, H or F.

25. A liquid crystal medium according to claim 24, further comprising one or more compounds of formula IV

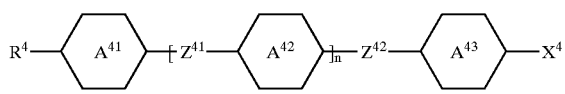

wherein

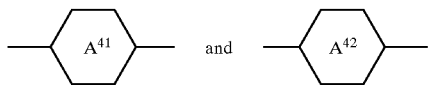

independently of each other, and in case

is present twice, also these, independently of each other, are

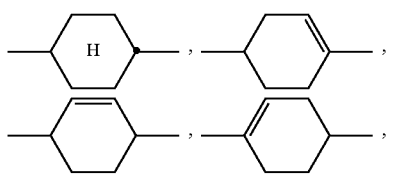

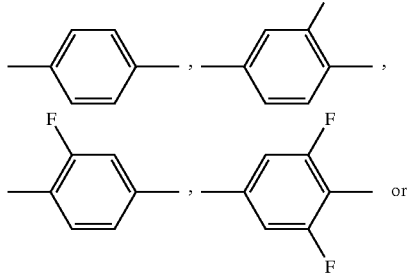

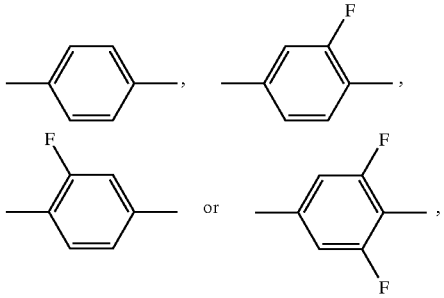

is

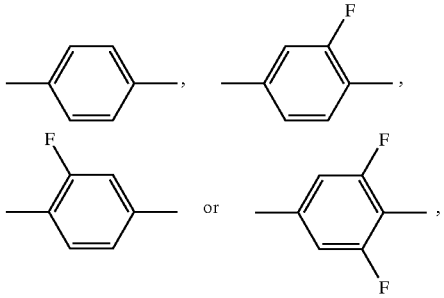

$Z^{41}$ and $Z^{42}$ are, independently of each other, and in case $Z^{41}$ is present twice, also these independently of each other, —CH$_2$CH$_2$—, —COO—, trans- CH=CH—, trans- —CF=CF—, —CH$_2$O—, —CF$_2$O— or a single bond, $X^4$ is F, Cl, halogenated alkyl, halogenated alkoxy, halogenated alkenyl or halogenated alkenyloxy, $R^4$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and n is 0, 1 or 2.

26. A liquid crystal medium according to claim 25, wherein $X^4$ F, OCF$_3$ or OCF$_2$H.

27. A liquid crystal medium according to claim 25, wherein $X^4$ is F, Cl, fluorinated and/or chlorinated alkyl, fluorinated and/or chlorinated alkoxy, fluorinated and/or chlorinated alkenyl or fluorinated and/or chlorinated alkenyloxy.

28. A liquid crystal medium comprising a dielectrically positive component A which comprises one or more dielectrically positive compounds of formula I

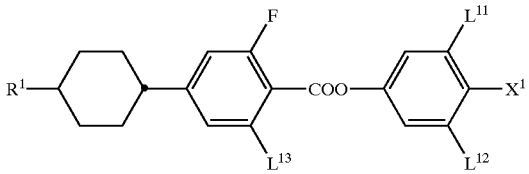

wherein $R^1$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, $X^1$ is F or fluorinated alkyl or fluorinated alkoxy, each with 1 to 4 C-atoms, and $L^{11}$, $L^{12}$ and $L^{13}$ are, independently of each other, H or F, and wherein said dielectrically positive component A further comprises one or more dielectrically positive compounds selected from formula II and comprises one or more dielectrically positive compounds selected from III

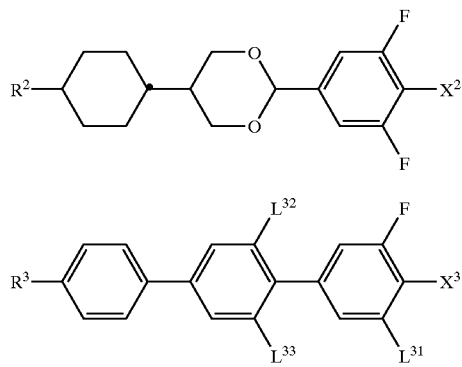

wherein

R² and R³, independently of each other, are alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, X² and X³ independently of each other, are F or fluorinated alkyl or fluorinated alkoxy, each with 1 to 4 C-atoms, and $L^{31}$, $L^{32}$ and $L^{33}$ are, independently of each other, H or F.

29. A liquid crystal medium according to claim 28, further comprising one or more compounds of formula IV

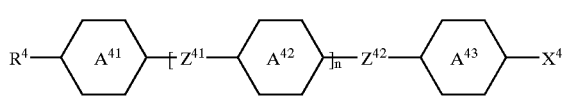

wherein

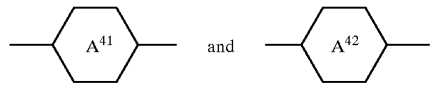

independently of each other, and in case

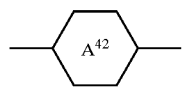

is present twice, also these, independently of each other, are

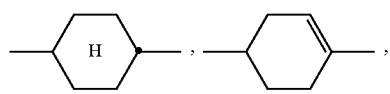

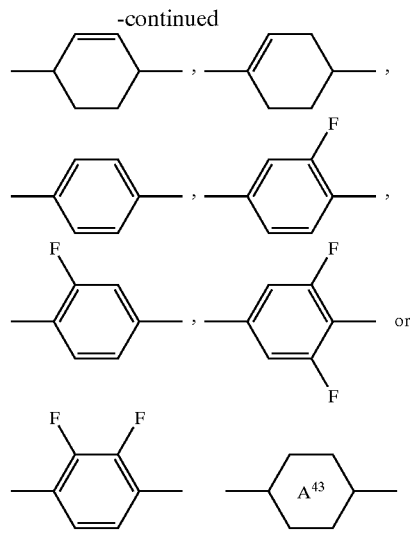

is

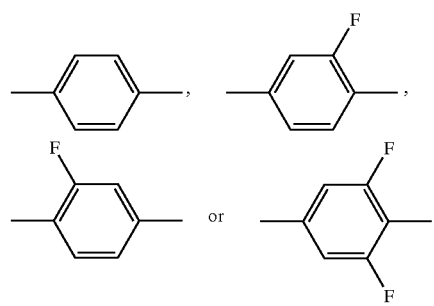

$Z^{41}$ and $Z^{42}$ are, independently of each other, and in case $Z^{41}$ is present twice, also these independently of each other, —CH₂CH₂—, —COO—, trans- CH=CH—, trans- —CF=CF—, —CH₂O—, —CF₂O— or a single bond, X⁴ is F, Cl, halogenated alkyl, halogenated alkoxy, halogenated alkenyl or halogenated alkenyloxy, R⁴ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms, and n is 0, 1 or 2.

30. A liquid crystal medium according to claim 29, wherein X⁴ is F, OCF₃ or OCF₂H.

31. A liquid crystal medium according to claim 29, wherein X⁴ is F, Cl, fluorinated and/or chlorinated alkyl, fluorinated and/or chlorinated alkoxy, fluorinated and/or chlorinated aLkenyl or fluorinated and/or chlorinated alkenyloxy.

* * * * *

UNITED STATES PATENT AND TRADEMARK OFFICE
CERTIFICATE OF CORRECTION

PATENT NO. : 6,793,985 B2
APPLICATION NO. : 10/259727
DATED : September 21, 2004
INVENTOR(S) : Shinji Nakajima et al.

It is certified that error appears in the above-identified patent and that said Letters Patent is hereby corrected as shown below:

Column 29, line 5, insert a line break between the two formulas.
Column 29, line 27, reads "trans-CF=CF-," should read -- trans- -CF=CF-, --
Column 29, line 32, reads "1 to 7 C-atoms atoms," should read -- 1 to 7 C-atoms, --

Column 30, line 30, please delete
Column 35, line 25, insert a line break between the two formulas.
Column 37, line 21, reads "F or fluorinated or" should read -- F or fluorinated alkyl or --
Column 37, line 21, reads "alkoxy,each" should read -- alkoxy, each --
Column 38, line 5, insert comma and line break between the two formulas.
Column 38, line 26, reads "tran- CH=CH-," should read -- trans- CH=CH-, --
Column 39, line 5, correct bonds inside the formula as the following:

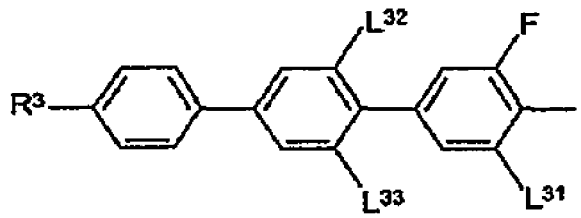

Column 40, line 5, insert comma and page break between the two formulas.
Column 41, line 2, after "from" insert -- formula --
Column 42, line 20, insert comma and line break between the two formulas.

UNITED STATES PATENT AND TRADEMARK OFFICE
CERTIFICATE OF CORRECTION

PATENT NO. : 6,793,985 B2
APPLICATION NO. : 10/259727
DATED : September 21, 2004
INVENTOR(S) : Shinji Nakajima et al.

It is certified that error appears in the above-identified patent and that said Letters Patent is hereby corrected as shown below:

Column 42, line 57, reads "chlorinated aLkenyl" should read -- chlorinated alkenyl --

Signed and Sealed this

Twenty-sixth Day of December, 2006

JON W. DUDAS
*Director of the United States Patent and Trademark Office*